Figure 1:
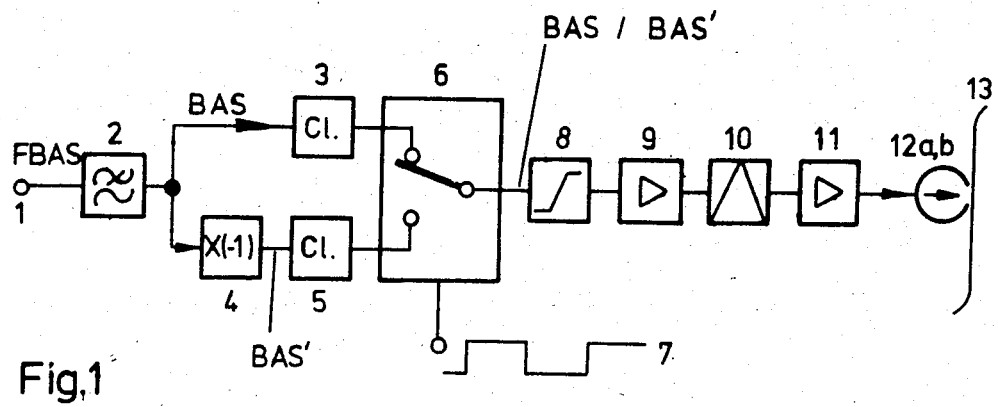

United States Patent [19]

Kluth

[11] Patent Number: 4,654,726
[45] Date of Patent: Mar. 31, 1987

[54] VIDEO RECORDER WITH REDUCED CROSS TALK

[75] Inventor: Hans-Jürgen Kluth, Villingen-Schwenningen, Fed. Rep. of Germany

[73] Assignee: Deutsche Thomson-Brandt GmbH, Villingen-Schwenningen, Fed. Rep. of Germany

[21] Appl. No.: 697,503

[22] Filed: Feb. 1, 1985

[30] Foreign Application Priority Data

Feb. 8, 1984 [DE] Fed. Rep. of Germany ....... 3404326

[51] Int. Cl.⁴ .......................... H04N 5/92; H04N 5/782
[52] U.S. Cl. ................................ 360/33.1; 360/34.1; 360/30; 360/64; 358/330; 358/328; 358/340; 358/335
[58] Field of Search ................. 360/34.1, 29, 30, 33.1, 360/64; 358/330, 328, 340, 335

[56] References Cited

U.S. PATENT DOCUMENTS 4,165,518  8/1979  Hirai .................................... 360/30
4,528,599  7/1985  Okano .................................. 358/328

*Primary Examiner*—Alan Faber
*Attorney, Agent, or Firm*—Max Fogiel

[57] ABSTRACT

Excessive cross talk between adjacent tracks can occur in a video recorder in which the line-synchronization pulses of adjacent tracks are not adjacent, in long-play or 8-mm video for example. The BAS signal is in accordance with the invention pole-reversed from track to track during recording when the video carrier is frequency-modulated in such a way that the level of the synchronization pulse corresponds alternately to the low and to the high frequency of the video carrier.

7 Claims, 3 Drawing Figures

VIDEO RECORDER WITH REDUCED CROSS TALK

In video recorders, the BAS (video) signal is usually traced onto slant tracks on a magnetic tape by frequency-modulating a video carrier. One one-field picture always drops out on each slant track. The value of the synchronization pulses is 3.6 MHz and the white level 4.8 MHz of the frequency-modulated video carrier. Recording occurs in such a way that the line-synchronization pulses of adjacent slant tracks are adjacent. When a scanning video head also scans the signal from the adjacent track as the result of cross talk, therefore, the signal will correspond to the identical pixel of the foregoing one-field picture, with the synchronization pulses of the scanned track and of the adjacent track, scanned as the result of cross talk, also coinciding in time. This measure decreases cross talk.

Cross talk between adjacent tracks can also be decreased if the head gaps of both video heads that trace the video signal alternately from one-field picture to one-field picture on the slant tracks are at an opposing angle of about ±7° to the width of the tracks. This further damps cross talk by exploiting what is called azimuth losses.

There are, however, video recorders that do not have this system of signals from adjacent slant tracks. The line-synchronization pulses for one track can be positioned in the linear middle for instance of the signal for the adjacent track. This occurs for example when a video recorder is operating in the long-play mode. The line-synchronization pulses for adjacent slant tracks can also be about half a line apart in video recorders of what is called the 8-mm format. Thus, the aforesaid correlation between signals for adjacent tracks is no longer provided in this type of recording. Scanning cross talk can then display the synchronization pulses of the adjacent track for example in the form of a dark vertical stripe. Such interference is decreased in a video recorder of the type known from U.S. Pat. No. 4,165,518 by displacing the carrier frequency from track to track by an odd multiple of the half-line frequency. The object of the present invention is to decrease video interference due to cross talk during recording in which the line-synchronization pulses of adjacent tracks are not adjacent.

This object is attained by the invention. Practical developments are described in the subsidiary claims.

In the system in accordance with the invention, therefore, the assignment of the various amplitude levels of the BAS signal to the frequency levels of the thereby frequency-modulated video carrier is consciously pole-reversed from track to track, meaning from one one-field picture to the next, in such a way that the synchronization pulse for one track will correspond to the frequency of 3.6 MHz and in the next track to the frequency of 4.8 MHz of the modulated video carrier. This can be done for instance by switching the modulation characteristic of the FM modulator over from track to track. The BAS signal is preferably supplied to the FM modulator during every other track through an inverter that reverses the polarity of the BAS signal. When, for example, a video head scans a track n and the synchronization pulses of the scanned BAS signal are in the ultrablack range, the synchronization pulses of the signal that has been scanned through cross talk from the adjacent track will extend as far as the white level. The vertical stripe that accordingly occurs in itself will therefore be essentially less visibly interfering than the stripes that occur without the invention. The aforesaid damping on the basis of azimuth angle that increases as far as the higher frequencies of the video carrier will make the synchronization pulses that extend as far as the white level and accordingly reside at high video-carrier frequencies almost invisible. Interference along the vertical picture edges will likewise be profoundly decreased because the differential frequencies between adjacent areas of the picture will be higher and no longer correlated.

Figure 2:
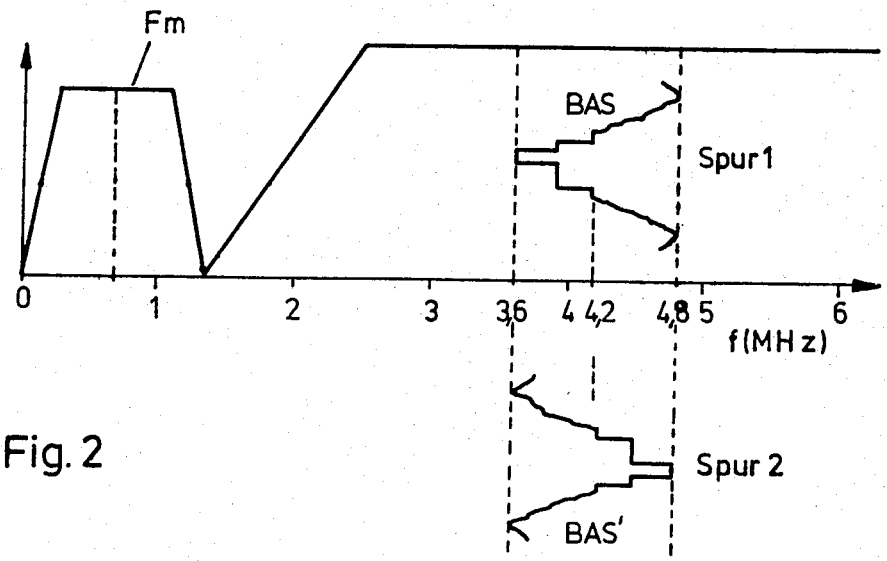
Figure 3:
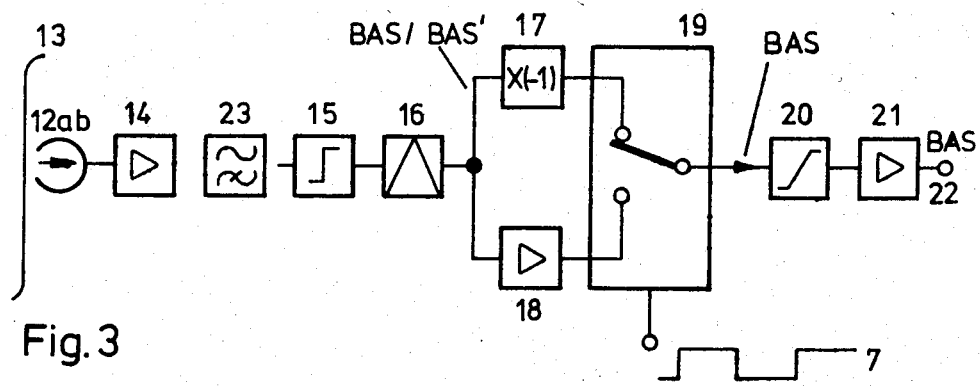

The invention will now be explicated in detail with reference to the drawing, in which FIG. 1 is a block diagram of the recording mode, FIG. 2 is a graph that illustrates modulation in accordance with the invention, and FIG. 3 is a block diagram of the playback mode.

A BAS signal is obtained from the FBAS signal at the terminal post 1 in FIG. 1 by means of a low pass 2 with a cut-off frequency of about 3.0 MHz. The BAS signal travels through a clamping stage 3 on the one hand and through an inverter 4 and a clamping stage 5 on the other to the two inputs of a changeover switch 6 that is activated by head-change pulses 7 derived with a frequency of 25 Hz from the head wheel at the commencement of each one-field picture. The BAS signal accordingly arrives with a polarity that is reversed from one one-field picture to the next at FM modulator 10, which generates a video carrier frequency-modulated with the BAS signal, through non-linear pre-emphasis stage 8 and amplifier 9. The video carrier arrives at the two video heads 12a and b, which trace the modulated carrier from one one-field picture to the next on slant tracks on magnetic tape 13, through amplifier 11.

FIG. 2 illustrates how the frequency modulation is reversed from one one-field picture to the next. The frequency-decreased, modified color carrier Fm is traced in the 0–1.5 MHz range. The switchgear are not illustrated in FIG. 1. The modulated video carrier is traced above color carrier Fm. Modulation occurs during track 1 in FM modulator 10 by means of BAS signals in such a way that the synchronization pulse corresponds to a frequency of 3.6 MHz and the white level to the frequency of 4.8 MHz of the modulated video carrier. This is the in-itself conventional modulation employed equivalently in each track.

During every other track the BAS signal is pole-reversed by changeover switch 6 into a BAS' signal, so that the frequency of the synchronization pulses will be the 4.7 MHz of the video carrier.

In FIG. 3 the signal is again scanned from magnetic tape 13 by video heads 12a and b and supplied to a discriminator 16 through an amplifier 14, a high pass 23 with a cut-off frequency of 1.5 MHz, and a limiter 15. Discriminator 16 supplies a BAS signal or a BAS' signal alternately from track to track and hence from one one-field picture to the next. This signal is supplied to a changeover switch 19 along two paths, through an inverter 17 and through an amplifier 18. The function of high pass 23 is to suppress quadrature-modulated color carrier F, which is traced below the frequency range of the video carrier at about 630 kHz. Changeover switch 19 is triggered by switching voltage 7 at the commencement of each one-field picture just like the changeover switch 6 illustrated in FIG. 1. Thus, at the switching state illustrated, the BAS' signal will be converted back into the BAS signal. This constantly produces as desired a BAS signal of identical polarity again at the output of changeover switch 19. This signal arrives through a non-linear de-emphasis stage 20 and an amplifier 21 at output terminal 22, available for video playback alone or in combination with color carrier F.

The circuit with components 4 and 6 in FIG. 1 can be combined into one circuit, active during both recording and playback, with the circuit with components 17, 18, and 19 in FIG. 3. This is possible because the circuit always pole-reverses the BAS signal at the commencement of each one-field picture.

What is claimed is:

1. A video recorder with reduced video cross talk between adjacent tracks, comprising: means for recording a color video signal of succeeding one-field pictures by means for frequency-modulating a video carrier onto slant tracks on a magnetic tape: means for varying from track to track assignment of the amplitude scale of the video signal to the frequency scale of the video carrier; assignment of the amplitude scale of the video signal to the frequency scale of the video carrier being pole-reversed from track to track, a predetermined value of said video signal corresponding to a predetermined frequency value of the recorded carrier in the frequency-modulation; said frequency modulating means being pole reversed in modulating direction from one-field to one-field.

2. A video recorder as defined in claim 1, including inverter means for passing said video signal to said frequency modulating means during every other track in recording mode.

3. A video recorder as defined in claim 1, including inverter means for passing the video signal generated by said frequency modulating means during every other track in playback mode.

4. A video recorder as defined in claim 3, including two video heads for scanning the magnetic tape alternately, said inverter means being triggered by a head-change pulse alternating the path of the video signal at the commencement of every one-field picture between said two video heads.

5. A video recorder as defined in claim 1, including first inverter means for passing the video signal to said frequency modulating means during every other track in recording mode; second inverter means for passing the video signal generated by said frequency modulator means during every other track in playback mode; and circuit means including said first inverting means and said second inverting means so that inversion during recording and opposite inversion during playback occur in the same circuit.

6. A video recorder with reduced video cross talk between adjacent tracks, comprising: means for recording a color video signal of succeeding one-field pictures by means for frequency-modulating a video carrier onto slant tracks on a magnetic tape; means for varying from track to track assignment of the amplitude scale of the video signal to the frequency scale of the video carrier; assignment of the amplitude scale of the video signal to the frequency scale of the video carrier being pole-reversed from track to track, a predetermined value of said video signal corresponding to a predetermined frequency value of the recorded carrier in the frequency-modulation; said frequency modulating means being pole reversed in modulating direction from one-field to one-field; first inverter means for passing the video signal to said frequency modulating means during every other track in recording mode; second inverter means for passing the video signal generated by said frequency modulating means during every other track in playback mode; two video heads for scanning the magnetic tape alternately; said second inverter means being triggered by a head-change pulse alternating the path of the video signal at commencement of every one-field picture between said two video heads; and circuit means including said first inverter means and said second inverter means so that inversion during recording and opposite inversion during playback occur in the same circuit.

7. A video recorder with reduced video cross talk between adjacent tracks, comprising: means for recording a color video signal of succeeding one-field pictures by means for frequency-modulating a video carrier onto slant tracks on a magnetic tape: means for varying from track to track assignment of the amplitude scale of the video signal to the frequency scale of the video carrier; assignment of the amplitude scale of the video signal to the frequency scale of the video carrier being pole-reversed from track to track, a predetermined value of said video signal corresponding to a predetermined frequency value of the recorded carrier in the frequency-modulation; said frequency modulating means being pole reversed in modulating direction from one-field to one-field; first inverter means for passing the video signal to said frequency modulating means during every in recording mode; second inverter means for passing the video signal generated by said frequency modulating means during every other track other track in playback mode; two video heads for scanning the magnetic tape alternately; said second inverter means being triggered by a head-change pulse alternating the path of the video signal at commencement of every one-field picture between said two video heads.

* * * * *